July 30, 1963 R. B. SPOONER 3,099,744
APPARATUS FOR MEASURING THE HEIGHT AND CONTOUR OF MATERIAL
Filed Dec. 21, 1959 7 Sheets-Sheet 1

INVENTOR.
ROBERT B. SPOONER
BY C. Daniel Cornish
his
ATTORNEY

July 30, 1963 R. B. SPOONER 3,099,744
APPARATUS FOR MEASURING THE HEIGHT AND CONTOUR OF MATERIAL
Filed Dec. 21, 1959 7 Sheets-Sheet 2

INVENTOR.
ROBERT B. SPOONER
BY C. Daniel Cornish
his
ATTORNEY

July 30, 1963  R. B. SPOONER  3,099,744
APPARATUS FOR MEASURING THE HEIGHT AND CONTOUR OF MATERIAL
Filed Dec. 21, 1959  7 Sheets-Sheet 3

Fig. 5

INVENTOR.
ROBERT B. SPOONER
BY C. Daniel Cornish
his
ATTORNEY

United States Patent Office 3,099,744
Patented July 30, 1963

3,099,744
APPARATUS FOR MEASURING THE HEIGHT
AND CONTOUR OF MATERIAL
Robert B. Spooner, Pittsburgh, Pa., assignor to Koppers Company, Inc., a corporation of Delaware
Filed Dec. 21, 1959, Ser. No. 861,019
7 Claims. (Cl. 250—71.5)

This invention relates to apparatus process for determining the height and contour of a surface.

In the making of steel, the charge in a blast furnace moves downwardly substantially continuously from a desired level. The rate of movement varies though, so the height of the surface of the blast furnace charge must be measured in order to determine when and how much material is needed to charge the furnace to a desired level. Blast furnaces are large structures, and contain hot and dirty gas under pressure; and because of these adverse ambient conditions, remote means for determining the elevation and contour of the surface of the furnace charge are necessary.

Heretofore, a mechanical probe has been used for remotely measuring the surface height of material at one or two locations. The probe has frequently been a rod that can be inserted in the top of a blast furnace and can be so arranged that a man standing near the top of the furnace is able to touch the top of the material in the furnace with the probe and determine the height of the furnace charge. This method is disadvantageous.

Insertion and removal of a probe through the top of the furnace at frequent intervals creates problems in sealing the internal furnace gases against escape to the atmosphere. The furnaces are usually charged with heavy solid materials from a bell chamber at the top of the furnace and this charging has frequently been damaging to the probe. Also, since the bell chamber for loading the furnace has been located at the top of the central axis of the furnace, it has been difficult to determine accurately the height of the furnace charge along or near the central axis of the furnace.

Another system has been to suspend a weight from a wire rope threaded through the furnace wall and over sheaves inside and outside the furnace so that the weight rests on the furnace charge and by rotation of the sheaves measure the height of the charge. This also has not been satisfactory because preventing leakage of gases from inside the furnace to the atmosphere between the wire rope and the furnace wall has been a problem, especially where increased pressures have been used in the blast furnace. Furthermore, the weight has sometimes been buried or tilted by the material charged into the furnace so that inaccurate measurements have been made. Also, the apparatus for translating the rotation of the sheaves into the elevation of the surface of the furnace charge have frequently been complicated and required frequent maintenance.

The methods of measuring the height of a surface as used heretofore have measured only elevation and have not determined the contour of a surface. The charge in a blast furnace frequently moves downwardly in an uneven manner so that one side of the surface of the charge becomes increasingly higher than the other side of the charge, and the resulting uneven surface contour of the charge causes difficulty in forcing a blast of air evenly upwardly through the charge from the bottom of the furnace. As a further indication of the nature of the problem, where the total depth of material in a blast furnace is typically as much as 100 feet, the top 90 feet or so is charge material or burden in the solid state. Thus, when certain portions of the furnace charge offer reduced resistance to the vertical passage of the upward blast of air due to a concentration therein of material having a larger particle size or due to a markedly reduced depth of charge therein, the reduction proceeds at a faster rate in these portions of the charge and the charge continues to sink faster in these portions causing an unevenness of surface which further aggravates the unequal passage of air. In order to remedy this situation it is necessary to be able to determine the development of this problem in its incipiency and quickly apply additional charge material to increase the resistance to air flow where this is required.

It is an object of this invention, therefore, to provide an improved apparatus for measuring the elevation and contour of a surface.

It is another object of this invention to provide an apparatus for measuring the elevation and profile of material in a container.

A still further object of this invention is to provide an improved apparatus for remotely measuring the surface elevation and contour of material charged into a blast furnace.

This invention contemplates apparatus for translating scattered radiation from a surface into an indication of the elevation and contour of the surface. More particularly, this invention in one of its embodiments, comprises means for directing radiation from a radioactive source against a specific zone of the surface of material whereby that zone scatters the radiation and translating therefrom the elevation and profile of this zone of the surface of the material. This invention has particular advantage with apparatus wherein remote elevation or contour measurements are necessary although a hot or dusty ambiance makes it difficult or impossible to use visual means, including television, to determine the height, contour or location of a surface.

The above and further objects and novel features of the invention will appear more fully from the following detailed description when the same is read in connection with the accompanying drawing. It is to be expressly understood, however, that the drawings are not intended as a definition of the invention but are for the purpose of illustration only.

Figures 1, 2, 10, 11, 12, 13:
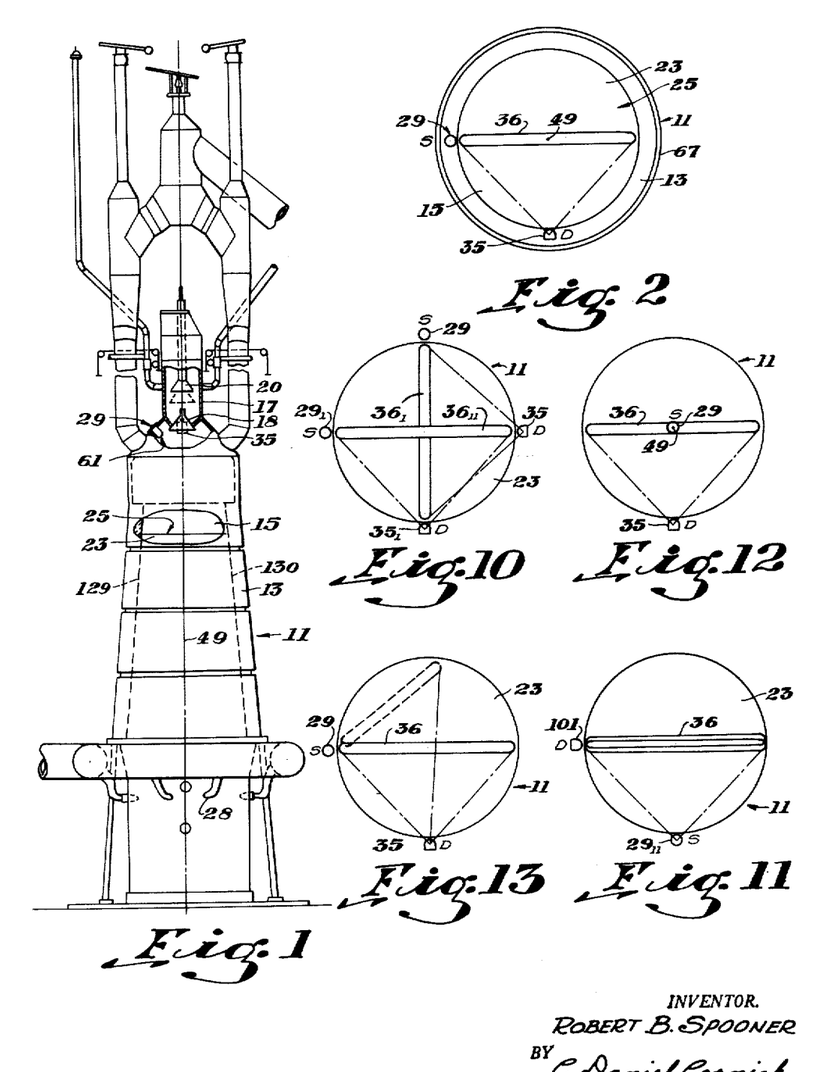
FIG. 1 is a partial elevation of a blast furnace incorporating the profilimeter of this invention.
FIG. 2 is a schematic top view of the arrangement of the radiation source and profilimeter of FIG. 1.
FIG. 10 is a schematic top view of a second arrangement of the radiation means and profilimeter of FIG. 1.
FIG. 11 is a schematic top view of a third arrangement of the radiation means and profilimeter of FIG. 1.
FIG. 12 is a schematic view of a fourth arrangement of the radiation means and profilimeter of FIG. 1.
FIG. 13 is a schematic view of a fifth arrangement of the radiation means and profilimeter of FIG. 1.
Figure 3:
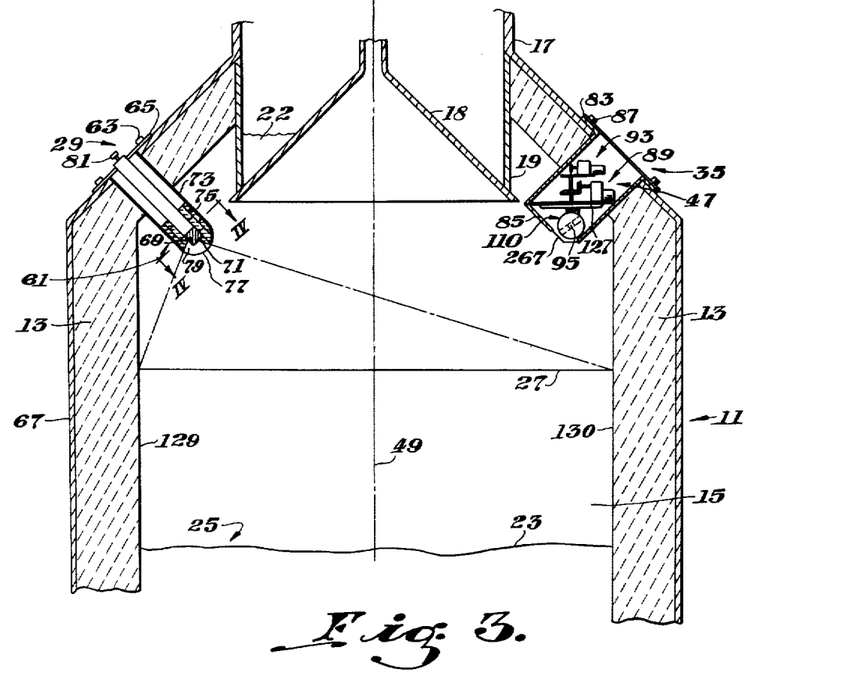
FIG. 3 is a partial cross section of FIG. 1 split at 90° to the center line of FIG. 1.
Figure 4:
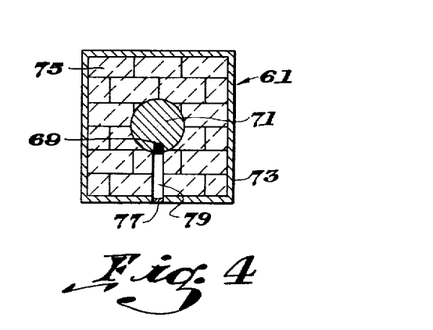
FIG. 4 is a partial cross section of the radiation means of FIG. 1 taken through IV—IV.
Figure 5:
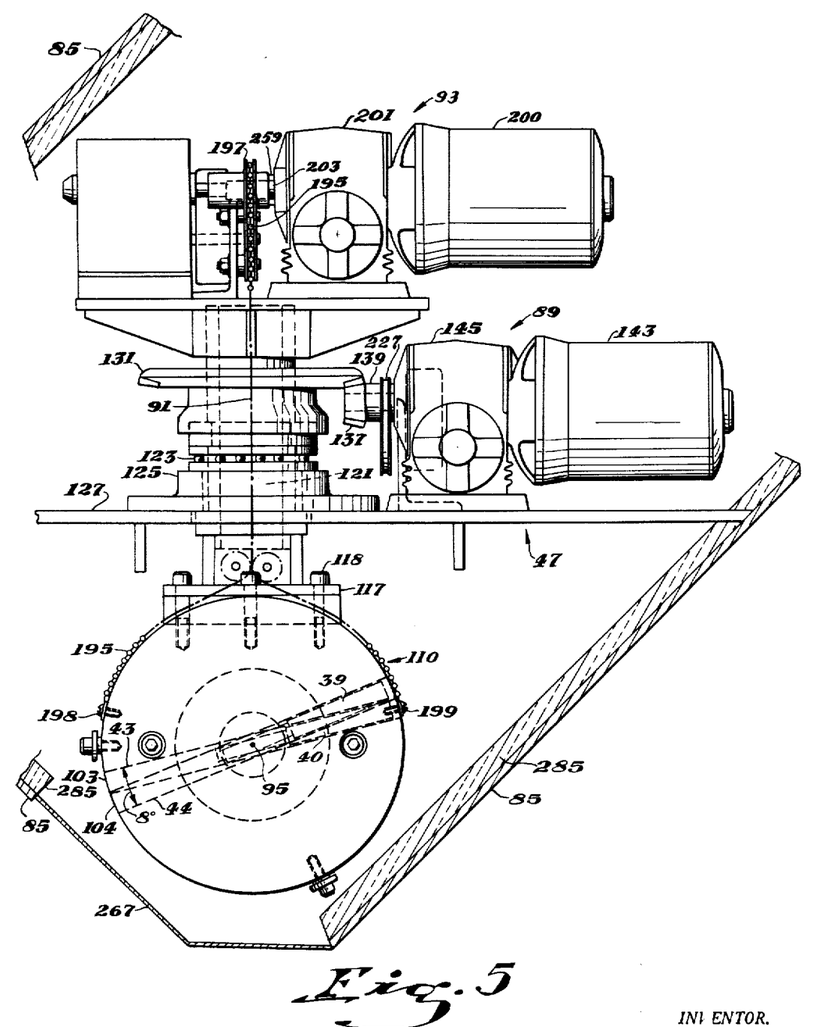
FIG. 5 is an exploded view of the profilimeter of FIG. 3.

This invention is illustrated in FIG. 1 as being incorporated in a conventional shaft type blast furnace 11. The wall 13 of blast furnace 11 forms a chamber 15 which is charged through a bell chamber hopper 17 in a well known manner. Lower bell 18 (FIG. 3) of hopper 17, opens and closes against extension 19 of hopper 17 while the upper bell 20 is closed. This permits solid material 22 on the lower bell to be charged into the furnace chamber 15 while maintaining furnace chamber 15 closed. Advantageously, the surface 23 of material 25, commonly referred to as a furnace charge or furnace burden, is charged to a predetermined substantially horizontal plane corresponding to horizontal planer stock line 27. When the charge is level or in a horizontal plane, the air blast forced into the bottom of chamber 15 through tuyeres 28 flows upwardly through material 25 uniformly. An even flow of air is desirable as it permits a uniform reduction of ore in the charge.

The reduction of the ore and the removal of iron and slag from the bottom of chamber 15 causes the charge slowly and continuously to move downwardly. The rate of downward movement at different positions, however, may be rapid or slow, even or uneven. It is desirable to be able to determine the elevation and contour of the surface in the furnace. As discussed above, this determination has been difficult heretofore because of the dusty working conditions on top of surface 23 of the furnace burden 25.

To determine the elevation or contour of the surface of the charge in accordance with this invention FIG. 2 shows a radiation source 29 and profilimeter 35 are incorporated into the furnace. The radiation source directs radiation across a specific zone or strip 36 of surface 23 of the furnace burden 25. The material 25 in zone 36 being dense, scatters the radiation and a response to the scattered radiation is made by the profilimeter 35 which then translates this radiation into distance indications of the height and contour of the surface 23.

The radiation is directed in a straight line to a specific area in the furnace. The heavy dense material in the furnace charge 25 which is irradiated then scatters this radiation and this scattered radiation strikes the profilimeter 35. Only a portion of the radiation is received by radiation detectors 39 and 40 in the profilimeter. Radiation collimators 43 and 44 in the profilimeter 35 insures that only parallel rays from a selected area are received in the profilimeter and directed against the detectors 39 and 40. So that the profilimeter 35 may scan in both a vertical and horizontal direction the profilimeter is moved by a suitable mechanism 47. Thus the profilimeter 35 can detect differences in radiation received and determine the variation of surface levels of the furnace charge 25 both in a vertical and in a horizontal direction from references, the references in the embodiment herein being the stock line 27 and the center vertical axis 49 of the furnace. Suitable indicia, for example, in FIGS. 7, 8 and 9 the movement of a pen 51 on a chart of a recorder 53 or the movement of indicators 55 and 56 on dials 57 and 58 show the variation from the references.

The radiation directed to area 36 in the furnace emanates from a thimble 61 that is attached to the furnace wall 13 above the stock line 27 by bolts 63 threaded through flange 65 on thimble 61 thereby permitting the removal of thimble 61 from shell 67 around furnace wall 13 when desired.

Radiation source 29 for the thimble 61 advantageously comprises a pellet 69 of radioactive material in a heavy metal plug 71. The radiation material may be 140 curie cobalt-60 and heavy metal plug 71 may be made of tungsten. The thimble 61 has a shell 73 of heavy gage material in which are placed steel bricks 75. The thimble serves as a shield so that radiation is admitted only from radiation window 77 over a slot 79 in the bricks, window 77 being of thin gage steel permitting the passage of radiation from pellet 69. Slot 79 serves as a collimator to insure that the radioactivity leaves the thimble 61 in parallel beams. Plug 71 is rotatably mounted in the bricks 75 in thimble 61 by handle 81 so that by rotation of handle 81 radiation pellet 69 can be placed out of register with slot 79 in a storage position where the steel bricks 75 and plug 71 substantially completely shield the furnace from the radiation from pellet 69, or can be placed in an operative position aligned with collimator slot 79 so as to direct radiation against surface 23 of charge 25 and produce an irradiated zone 36 thereof.

The dense material of radiation zone 36 scatters any radiation applied to it and a response to the scattered radiation is made by profilimeter 35 which is removably mounted on furnace wall 13 by means of flange 83 of profilimeter thimble 85 and bolts 87 threaded through flange 83 into the furnace shell 67. The profilimeter 35 translates the radiation into an indication of the height and contour of surface 23. To this end in profilimeter 35 collimators 43 and 44 receive radiation from irradiated zone 36 and direct the radiation to radiation detectors 39 and 40. The detectors are moved by actuating mechanism 47 which incorporates motor and gearing 89 for rotating collimators 43 and 44 in a horizontal plane about an axis 91 designated as a phi axis and motor and gearing 93 for rotating collimators 43 and 44 in a substantially vertical plane about an axis 95 designated at the theta axis. The movements of collimators 43 and 44 maintain the detectors 39 and 40 pointed toward the irradiated zone 36. The movements of collimators 43 and 44 are functions of the height of points along zone 36 relative to the level of profilimeter 35 so that elevation and contour indications of surface 23 can be made.

Detector collimators 43 and 44 are provided by cylindrical iron casting 101 (FIG. 6) which has two holes 103 and 104 bored therethrough the central axis thereof being at about an 8° angle to each other. The collimating function of these holes allows only parallel beams of radiation to pass therethrough and to this end casting 101 acts as a radiation shield. Casting 101 is journalled on pins 105 and 106 seated in hemispherical castings 107 and 109. Castings 107 and 109 are secured to hoops 111 and 113 and bar 115 maintains these hoops in spaced relation.

The castings 101, 107 and 109 depend as a detector assembly 110 from plate 117 by hoops 111 and 113 which are secured as by bolts 118 to plate 117.

Plate 117 is attached to vertical shaft 121 which is rotatable in thrust bearing 123, that is mounted on collar 125 and plate 127 so that the detector assembly 110 may be rotated around the phi axis substantially in a horizontal plane.

Detector assembly 110 is moved around the phi axis in a substantially horizontal plane to sweep collimators 43 and 44 across the irradiated zone 36 from one side 129 to the other side 130 of furnace 11 by rotation of beveled gear 131 on shaft 121. Beveled gear 131 is driven by beveled gear 137 on shaft 139 rotated by motor 143 through reduction gear 145. Motor 143 advantageously is a small alternating current motor. Beveled gear 131 carries two cams 147 and 149 (FIG. 7) which rotate back and forth with the beveled gear 131 thus to actuate limit switch 153 which in turn controls the actuation of the shaft of motor 143 and shaft 139 of gear reducer 145 to move in right and left hand directions as described in more detail hereinafter.

Figure 7:
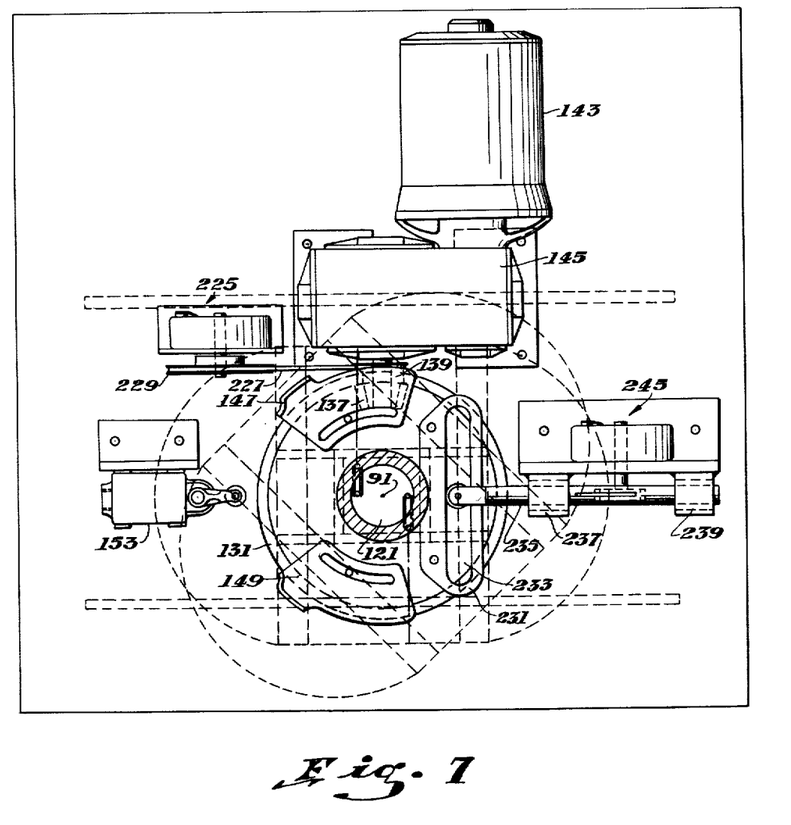
FIG. 7 is a partial top view of FIG. 6 taken through VII—VII.

The control circuit for motor 143 includes power source 155 which supplies power through armature 157 (FIG. 8) to timer motor 159. Timer motor 159 energizes timer 161 to momentarily close timer armature 163 at predetermined time intervals advantageously about five minutes apart. When timer armature 163 closes, power source 155 supplies power to right relay 165 so as to pull right relay armatures 167 and 169 downwardly to contact contacts $167_1$ and $169_1$ and armature 171 downwardly to disengage contact $171_1$. Armature 169 closes with contact 169₁ to energize relay 175 to pull the armatures 177 of contactor 179 downwardly from a normally noncontacting center position to engage contacts 177₁ to energize motor 143 from a suitable power source in a right hand direction (clockwise facing motor 143 from the shaft end). Armature 167 closes with contact 167₁ to act as a holding armature for relay 165 when timer armature 163 opens. This right hand energization of motor 143 moves bevel gear 131 (and detector assembly 110) to the right (clockwise as shown in FIG. 7) until cam 149 contacts limit switch 153. When cam 149 moves far enough to the right cam 149 opens normally-closed armature 183 of limit switch 153 to de-energize right relay 165 thus to pull armature 171 upwardly to engage contact 171₁ to energize left relay 185. Energization of left relay 185 pulls its armature 186 downwardly to engage contact 186₁ so as to energize relay 175 to pull armatures 177 of contactor 179 upwardly to engage contacts 177₁₁ and 177₁ to energize motor 143 in the left hand (counterclockwise) direction thus causing beveled gear 131, cams 147 and 149 (and detector assembly 110) to move around the phi axis to the left. Cam 149 then moves in a counterclockwise direction to disengage cam limit switch 153 which closes armature 183 with contacts 183₁. Timer armature 163 being open, right relay 165 is not then energized. Movement far enough to the left causes the cam 147 to contact cam limit switch 153 to open armature 189 which de-energizes left relay 185. This opens armature 186 which moves armatures 177 upwardly to a normally nonconducting central position to de-energize motor 143 so that another sequence, as described above, can take place when timer armature 163 closes. Armature 191 is connected to recorder 53 so that when timer armature 163 closes to actuate motor 143 in a right hand direction the recorder pen 53 is operable to make a tracing.

So that detector collimators 43 and 44 can rotate around a theta axis to maintain the collimators directed at irradiated zone 36, pins 105 and 106 (FIG. 6) are journalled in bearings 193 and 194 in hemispherical castings 107 and 109 described above. A bead chain 195 (FIG. 6) on sheave 197 has ends attached to casting 101 by bolts 198 and 199. Sheave 197 is driven by a motor 200 advantageously a permanent magnet direct current motor which actuates gear reducer 201 which in turn actuates shaft 203 and sheave 197 to rotate casting 101 about the theta axis.

Figure 6:
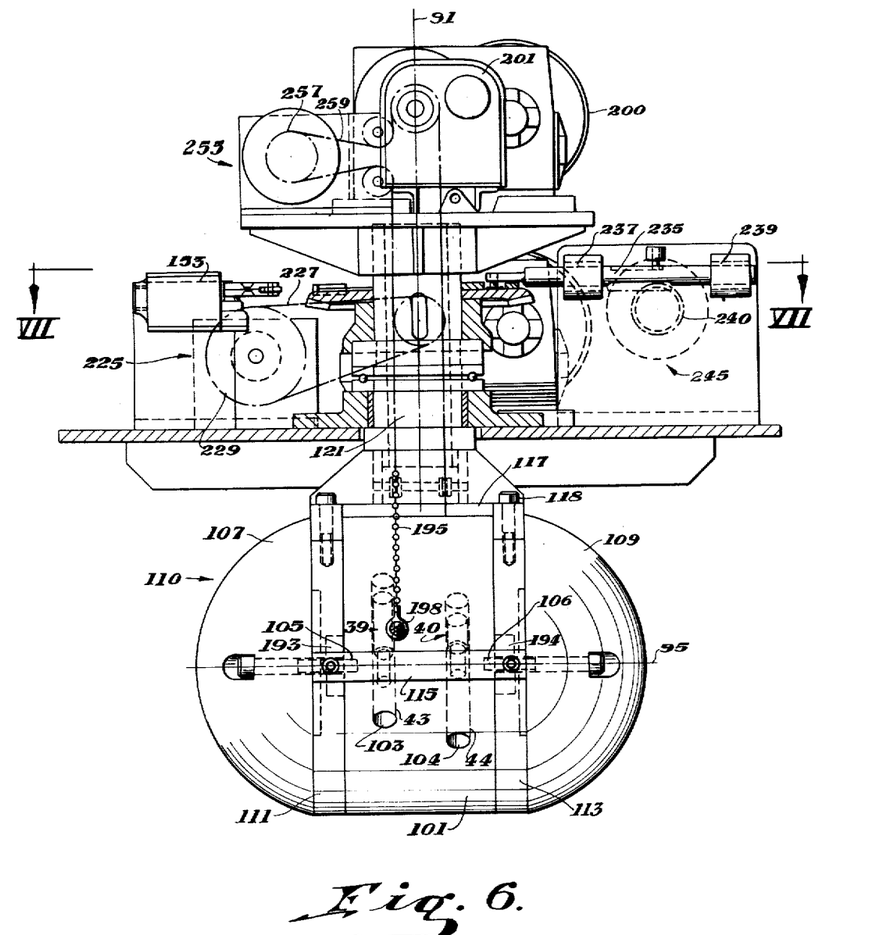
FIG. 6 is a partial side elevation taken at 90° to FIG. 5.

The control circuit system for motor 200 keeps the detector collimators 43 and 44 pointed at zone 36. Inside collimator slots 43 and 44 are radiation detectors 39 and 40 which comprise two thalium-activated sodium iodide crystals 205 and 207 in operable association with photo multiplier tubes 209 and 211. In response to radiation, the crystals 205 and 207 produce light flashes. Tubes 209 and 211 which are energized from power source 213, respond to the light flashes by developing electrical impulses. Leads 215 and 216 transmit these pulses to amplifiers 217 and 218. When the pulse or signal to the amplifier 217 is stronger than the pulse or signal to amplifier 218 motor 200 is actuated in a direction to rotate casting 101 downwardly (as seen in FIGURE 6) around the theta axis, and when the signal to amplifier 218 is stronger than the signal to amplifier 217 motor 200 is activated to rotate casting 101 in the opposite direction. When the signals to amplifiers 217 and 218 are equal, the shaft of motor 200 connected to gear reducer 201 is stationary.

From the foregoing it can be seen that the position of shaft 139 (on which gear 137 and belt 227 are positioned) corresponds to the position of collimator tubes 43 and 44 about the phi axis. Similarly, the position of shaft 203 (on which sheave 197 is pinned) corresponds to the position of collimator tubes 43 and 44 about the theta axis.

To provide an electrical signal corresponding to its position motor 143 rotates tangent slider 221 (FIG. 8) of potentiometer 225 by means of belt 227 (FIG. 7) which rotates over sheave 229 attached to the potentiometer slider 221 and over shaft 139 of beveled gear 137. The movement of slider 221 gives a phi or X signal. To provide a correction signal, beveled gear 131 includes a channel 231 (FIG. 7) with a slot 233. The oscillation of beveled gear 131 oscillates arm 235 constituting a rack that is slideable in guides 237 and 239 and that rotates a gear 240 (FIG. 6) which is attached to a slider 244 of linear or secant potentiometer 245. To provide a signal corresponding to its position, motor 200 positions a slider 250 of tangent potentiometer 255 (FIG. 8) by means of sheave 257 attached to the slider 250 and rotatable with belt 259 which rotates over sheave 257 and shaft 203 of gear reducer 201. The movement of slider 250 provides a theta or Y signal.

Computer circuit 261 (FIG. 8) comprises in the main of potentiometer 225, 245 and 255. Potentiometers 225 and 245 are driven by the phi rotation of detector assembly 110 and potentiometer 255 is driven by the theta rotations of central casting 101 of detector assembly 110. Potentiometers 225 and 255 are wound in such a fashion as to give a voltage proportional to the tangent of the angle of rotation within the range of rotation. In the range from −45° to +45° this variation does not depart much from that given by an ordinary linear potentiometer. Potentiometer 245 must give a voltage proportional to the secant of the angle phi. Because the change in voltage is so small near phi=0 it is easy to accomplish this type of variation with a linear potentiometer arrangement that will also take into account loading of the circuit by potentiometer 255 measuring the tangent of phi. Computer circuit 261 translates the theta and phi signals of potentiometers 225 and 255 into visual representations thereof and places on XY recorder 53 an accurate distance trace of the height and contour of zone 36. Potentiometers 225 and 245 have a common constant power source 299 which also supplies power to recorder 53. The power source 299 produces a constant voltage on potentiometers 245 and 225. As beveled gear 131 moves slider 244 back and forth slider 244 produces a variable voltage on potentiometer 255. Motor 200 causes slider 250 to move back and forth so that slider 250 produces a variable voltage which is a function of the variable input from slider 244. The Y voltage from slider 250 moves pen 51 up as the voltage from slider 250 increases and down as the voltage from slider 250 decreases. The voltage from slider 221 moves pen 51 back and forth horizontally so that when the voltage from slider 221 increases pen 51 moves to the right and when the voltage from slider 221 decreases the pen 51 moves to the left.

Figure 14:
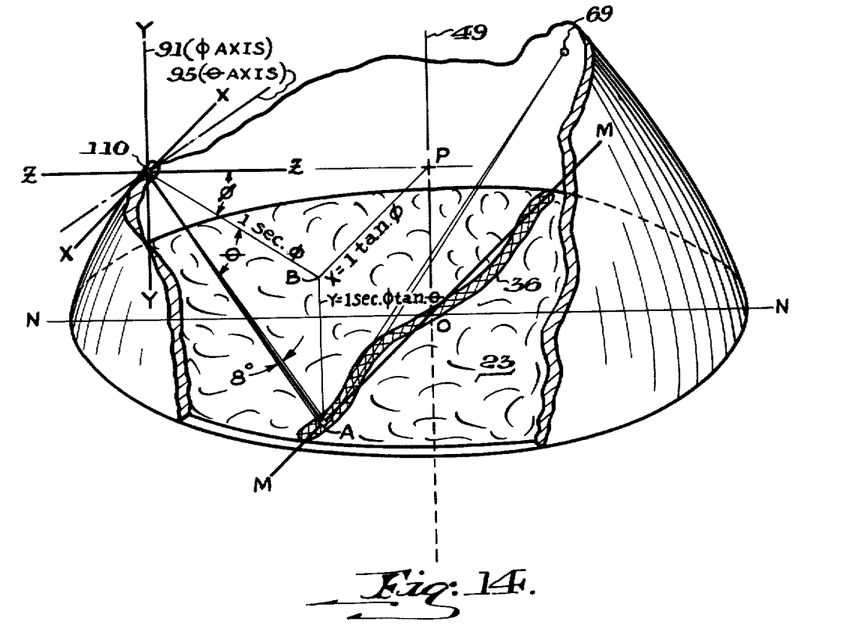
FIG. 14 is an isometric view diagrammatically presenting the trigonometric relationships employed in the present invention.

Computations made by computer circuit 261 to provide the desired intelligence for presentation on recorder 53 depend upon the trigonometric relationships set forth diagrammatically in FIG. 14. As shown therein, when viewed at any given instant surface 23 is an uneven surface and as a result, ribbon-like zone 36 on which is impinged the radiation from pellet 69 is illustrated in isometric as a bumpy, wavy strip on surface 23. Line M—M is an imaginary projection of the center line of zone 36 in the plane perpendicular to central vertical axis 49 at point 0. The center line of the zone 36 is defined as that portion of the zone from which the maximum amount of scattered radiation is reflected. Line X—X is an imaginary reference axis passing through the center of detector assembly 110 parallel to line M—M and lying in a horizontal plane perpendicular to central vertical axis 49 at point P. The theta axis, axis 95, as shown rotates in the horizontal plane passing through line X—X so that when casting 101 is pointed at point 0, the intersection of central vertical axis 49 and zone 36, axis 95 coincides with line X—X. Line Y—Y is the same as axis 91 (also referred to as the phi axis) and is parallel to central vertical axis 49 lying in a common plane therewith.

Representing the distance from the center of detector assembly 110 to point P on the vertical central axis 49 of the furnace 11 as unity or "1," the horizontal distance X from vertical central axis 49 to any point along line M—M, such as point A, will be solved by computer circuit 261 using the equation $X=1$ tan phi. Likewise to determine the vertical distance BA from the horizontal plane passing through line X—X (and point P) down to point A the computer circuit 261 employs the equation $Y=1$ sec phi tan theta. As shown, angle phi is the angle generated in the horizontal plane passing through line X—X as detector assembly 110 is rotated about axis 91 as its sweeps zone 36. The reference line for this angle is the imaginary line Z—Z between the center of detector assembly 110 and point P. Angle theta is the angle between the horizontal plane passing through line X—X and the line connecting the center of detector assembly 110 with the point along the centerline of zone 36 (in this case point A) which is being located. Angle theta lies, of course, in that plane containing line Y—Y and, in this example, point A and is the angle generated by rotating casting 101 about axis 95 to maintain radiation detectors 39, 40 properly aimed at irradiated zone 36 as angle phi is being generated.

Having received the value of phi and theta for any point along line M—M such as point A and having introduced this intelligence to potentiometers 225, 245 and 255 as described above the computer circuit 261 can locate the point. By locating point by point along the centerline of zone 36 in this manner computer circuit 261 can cause recorder 53 to reproduce the profile of this centerline of zone 36 for the operator as it would appear in a plane passing through line M—M and central vertical axis 49. Also, since the elevation of the center of detector assembly 110 is known, the profile may be expressed in terms of actual elevation.

It has been found that computer resistors of about 100 ohms are satisfactory for potentiometers 245 and 255 and resistors of about 1000 ohms for potentiometer 255. The circuit is loaded only by a data read-out system and its input resistance of 10,000 to 15,000 ohms gives insignificant loading or error. The voltage supplied to the circuit 261 is also supplied through line 263 to the recorder 53 for standardizing the recorder. Use of the same voltage source for both functions avoids many calibration problems.

Figure 8:
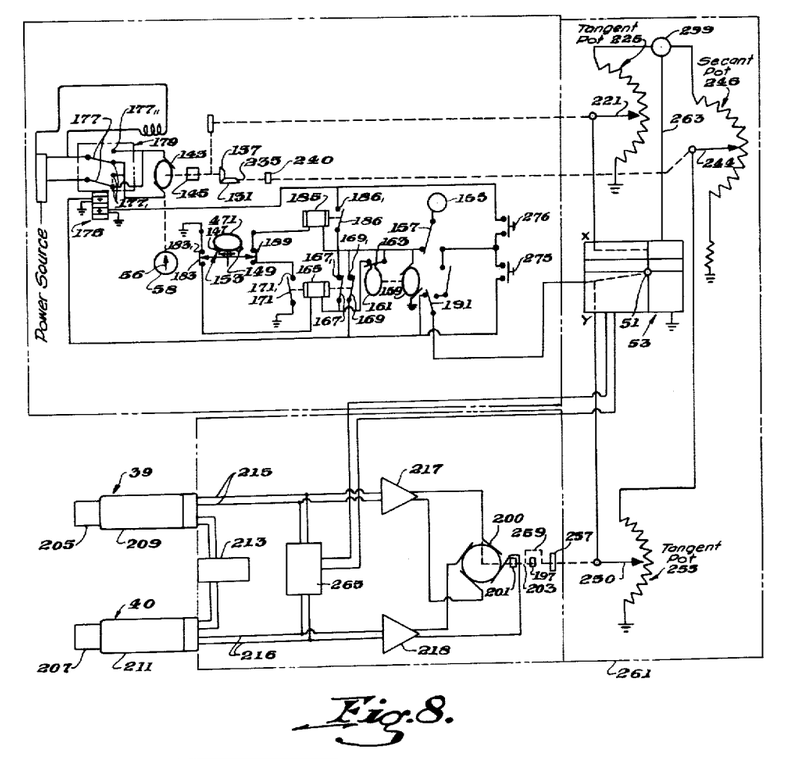
FIG. 8 is a schematic diagram of control circuits for the detector of FIG. 5.

The control system as shown by FIG. 8 takes electrical pulses from the two detectors 39 and 40, compares them in number and uses the difference to control the theta rotation of central casting 101 of the detector assembly 110. An allowable error of six inches in level height corresponds to a minimum error of 0.65° in theta rotation. This condition occurs at a —13 feet level from stock line 27. This same elevational or angular interval corresponds to a range of signal strengths from detectors 39 and 40 that must be maintained steady for smooth control. This range of signal strengths, because of inherent statistical fluctuations must be set at a high enough signal level that there is little probability for the fluctuations to go beyond the specified range. For the purposes of design of this invention the specification may be for the indication to be within ¼ foot of the proper value 99% of the time. To this end 25,000 pulses per minute may be received from the detectors.

In most instances the design of this invention by comparing relative signal strengths of two channels avoids the extreme stability or regulation problems connected with radiation intensity measuring gages. In operation, photomultiplier tubes 209 and 211 may operate over a broad range of signals from 25,000 counts per minute to 500,000 counts per minute.

The amplifiers 217 and 218 convert the electrical impulses from their detectors into uniform positive and negative pulses and are balanced with respect to each other.

Differential count rate meter 265 offers a choice of several time constants, for example, the control circuit time values may be 1 second, 3 seconds, and 10 seconds and the correction time values may be .3 seconds, 1 second and 3 seconds. A feature of the differential count rate meter 265 is the capacity to take one detector output at a time and send its signal to recorder 53. With manual variation of theta rotation the signal can be measured for peak value and compared to the corresponding value of the other detector. The operator can thus quickly determine if the two signal channels are operating and balanced.

In operation radiation source 29 irradiates zone 36 of surface 23 of material 25. The material 25 being of dense nature, scatters the radiation. Profilometer 35 receives scattered radiation through radiation window 267 of profilometer thimble 85, window 267 advantageously being aluminum to pass weak scattered radiation. Collimators 43 and 44 of central casting 101 of detector assembly 110 receive the scattered radiation and directs the radiation at first and second radiation detectors 39 and 40 arranged at an angle of about 8° to each other in collimators 43 and 44 respectively. The detectors produce signals proportional to the amount of radiation being received by each of the detectors. When the signals are equal a line bisecting the angle of the detector collimators to each other is directed at some point along irradiated zone 36. When surface 23 moves vertically so that one detector collimator is pointed more directly at zone 36 than the other collimator the detector of the latter collimator produces a weaker signal than the signal from the former detector. An error voltage equaling the difference between the stronger and weaker signals actuates motor 200 to rotate the central casting 101 of detector assembly 110 around a theta axis to reduce the error voltage to zero thus to maintain the line bisecting the angle of the detector collimators directed at zone 36. Motor 200 also actuates slider 250 of tangent potentiometer 255 the output of which together with the output of correction potentiometer 245 in computer circuit 261 causes pen 51 of recorder 53 to move up and down to make a tracing which gives a distance reading of the elevations along the portion of irradiated zone 36 at which collimators 43 and 44 are pointed relative to stock line 27.

Motor 143 actuates detector assembly 110 at given time intervals to move back and forth around a phi axis substantially in a horizontal plane so that the detectors 39 and 40 and their collimators 43 and 44 sweep across the irradiated zone 36 from one side of the furnace to the other. Motor 143 actuates slider 244 of correction or secant potentiometer 245 mentioned above and slider 250 of tangent potentiometer 255 to cause pen 51 of recorder 53 to move back and forth horizontally to give a distance reading of the horizontal portion of zone 36 at which collimators 43 and 44 are pointed relative to the furnace axis 49. The signals from tubes 209 and 211 to differential count meter 265 may be fed into recorder indicator 53 and added to the X signal from slider 221 of potentiometer 225 thus correcting any lag in the mechanical system of actuating mechanism 47.

To determine the elevation and contour of the surface 23 of the charge 25 in furnace 11 in accordance with a manual embodiment of this invention, detector 39 alone of profilometer 35 operates with indicators 55, 56 and 273 for determining the amount of radiation received by detector 39 and the amount of movement of casting 101 vertically and horizontally around the theta and phi axes, to determine the height and contour of zone 36 of surface 23.

Figure 9:
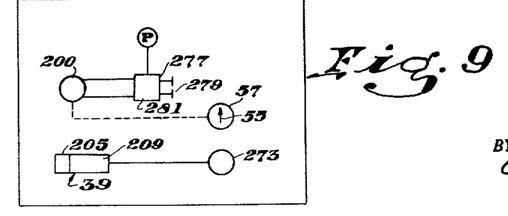
FIG. 9 is a schematic view of another arrangement for a portion of the control circuit for the profilimeter as shown in FIG. 8.

Referring to FIG. 9 in this second embodiment, radiation detector 39, comprising thalium-activated sodium iodide crystal 205 and photomultiplier tube 209 produces a signal proportional to the amount of radiation received thereby and the relative amount of this received radiation is indicated on scintillation counter indicator 273. Thus when collimator 39 is directed at irradiated zone 36 of surface 23 the scintillation counter indicator 273 shows a high reading and as the collimator 44 of detector 39 is pointed away from irradiated zone 36 the scintillation counter indicator 273 shows a lower reading. It is quite easy, therefore, to tell if the collimator 44 is pointed at irradiation zone 36 by moving casting 101 of detector assembly 110 back and forth in a vertical plane around the theta axis and comparing the readings obtained on the scintillation counter indicator 273.

The movements of casting 101 and detector assembly 110 around the theta and phi axes are functions of the height and contour of zone 36 of surface 23 as described above and it is a simple matter to determine these relative movements of the casting 101 and detector assembly 110 by attaching a flexible coupling to motors 200 and 143 and attaching the couplings to pointers 57 (FIG. 9) and 58 (FIG. 8) in meters 55 and 56 having indicia scaled to translate the rotational movements of motors 200 and 143 into distance readings of the height and profile of zone 36 relative to stock line 27 and the central axis of furnace 49. Thus meter 56 indicates the location of the point of zone 36 at which collimator 39 is pointed relative to the central axis 49 of the furnace 11 and indicator 55 indicates the location of the point of zone 36 at which collimator 39 is pointed relative to stock line 27. Since the scintillation counter indicator 273 indicates when detector 39 is pointed at zone 36 the readings of indicators or meters 55 and 56 can be plotted on a graph to indicate the elevation and profile of zone 36 along surface 23.

The apparatus described above and shown in FIG. 8 with relation to the first embodiment can be used in this embodiment to move the detector assembly back and forth in a horizontal plane around the phi axis either automatically or by manual activation at some remote position. For example, depression of push button 275 (FIG. 8) energizes relay 175 to actuate motor 143 to rotate detector assembly 110 horizontally to the right around the phi axis. Depression of left push button 276 energizes relay 175 to actuate motor 143 to move detector assembly 110 horizontally to the left around the phi axis.

The apparatus of the first embodiment described above can also be used in this embodiment to move casting 101 of detector assembly 110 automatically back and forth around the theta axis in a vertical plane. To execute this movement of casting 101 of detector assembly 110 by manual activation from some remote position in accordance with this embodiment, push buttons 277 and 279 (FIG. 9) are employed to cause contactor 281 to actuate motor 200 in a clockwise or counterclockwise direction. When the motor 200 is actuated in a clockwise direction by the depression of right push button 277 the motor rotates collimator 44 upwardly and when the motor 200 is actuated in a counterclockwise direction by the depression of left push button 279 collimator 44 is rotated downwardly.

Since the purpose of detectors 39 and 40 are for automatic joint actuation of casting 101 of detector assembly 110 around a theta axis it is understood that in a strictly manual remote system for moving casting 101 around the theta axis detector 39 is required and detector 40 is not required.

In the manual remote operation of this embodiment, radiation source 29 irradiates zone 36 of the surface 23 of material 25 substantially diametrically from one side of furnace 11 to the other side. Zone 36 of surface 23 scatters radiation. Depression of push button 275 rotates detector assembly 110 to the right around a phi axis substantially in a horizontal plane. Depression of push buttons 277 and 279 in sequence rotates detector collimator 44 up and down respectively around the theta axis substantially in a vertical plane until scintillation counter indicator 273 shows a high reading. Indicators or meters 55 and 56 indicate the phi and theta angles required to describe the movement of collimator 44 relative to the horizontal plane through stockline 27 and to axis 49, and the indicated values may be plotted on a graph. Thereafter depression of push buttons 275 and 276 in sequence moves detector assembly 110 back and forth in a horizontal plane and permits further readings on indicators 55, 56 and 273. Again the indications of the indicators can be plotted on a graph and a series of such plots will show the elevation and profile of zone 36 of surface 23.

It is understood in all the embodiments described thermal insulation 285 inside profilimeter thimble 85 may be provided along with air cooling means (not shown) for circulating cool air inside thimble 85 to keep the profilimeter cool.

In another embodiment of this invention shown schematically in FIG. 10, two profilimeters 35 and $35_1$ and two radiation sources 29 and $29_1$ similar to those described with reference to FIG. 2 are used. Such an arrangement gives elevation and profile indications of zones $36_1$ and $36_{11}$ and therefore of surface 23 over a greater portion thereof than with the arrangement of FIG. 2. From such multiple profiles the contour of surface 23 can be reproduced.

In another embodiment of this invention shown schematically in FIG. 11 radiation source $29_{11}$ is moveable around theta and phi axes and casting 101 is stationary.

In still another embodiment of this invention, shown schematically in FIG. 12 radiation source 29 is located along the axis 49 of furnace 11 and profilimeter 35 is located at the side of furnace 11.

It is understood that in another embodiment of this invention as shown in FIG. 13 both the detector and the radiation source may be moveable.

This invention produces a zone of scattered radiation on a surface, directs a radiation detector at the irradiated zone so that the movements of the detector are functions of the height and profile of the surface of the irradiated zone and translates these movements into remote distance indications of the elevation and contour of the surface relative to a horizontal reference plane and to a vertical axis.

What is claimed is:

1. Apparatus for determining the elevation and contour of the irregular surface of a furnace charge comprising:
    (a) means position above said surface for irradiating a narrow zone of the surface,
    (b) rotatably mounted detecting means positioned above said surface for responding to scattered radiation,
    (c) first means connected to said detecting means for rotating said detecting means in a substantially horizontally plane,
    (d) second means connected to said detecting means for rotating said detecting means in a substantially vertical plane,
    (e) control means connected to said second means for maintaining said detecting means directed at said narrow zone during simultaneous rotation of said detecting means by said first means, and
    (f) means connected to said control means for translating the rotational movements of said first and second means into a measurement of the elevation and profile of said narrow zone.

2. Apparatus for determining the elevation and contour of an irregular surface of dense material in a blast furnace comprising:
    (a) a radiation source comprising a radioisotope positioned above said surface,
    (b) means for directing radiation from said source against a localized portion of said surface thereby irradiating said portion whereby said dense material scatters the radiation, (c) said radiation source being housed within said means for directing radiation, (d) a radiation detector positioned above said surface and lying along a vertical plane perpendicular to a vertical plane through said portion of said surface, (e) means connected to said radiation detector for collimating the scattered radiation reaching said detector, (f) means for determining whether said collimating means is directed at said portion of said surface, (g) means connected to said detector and collimating means for rotating said detector and collimating means about mutually perpendicular axes so as to direct said collimating means at said portion of said surface, (h) said determining means being connected to and exercising control over said rotating means, (i) and means connected to said rotating means for translating the movement of said detector and collimating means into a measurement of the elevation and profile of said portion of said surface of said material in said blast furnace.

3. Apparatus for determining the height and contour of an irregular surface of dense material in a blast furnace comprising:

(a) a radiation source (b) a housing for said source mounted on said blast furnace and positioned above said surface for directing radiation from said source against an elongated portion of said surface to irradiate said portion whereby the dense material thereof scatters said radiation, (c) a scintillation counter having collimating means for collimating radiation scattered by said elongated portion against said counter, said counter being mounted in said furnace above said surface and lying along a vertical plane perpendicular to a vertical plane through the longitudinal centerline of said elongated portion, (d) means for positioning said collimating means so as to assure the reception of radiation scattered by said elongated portion regardless of the irregularity of said surface whereby the positioning of said collimating means is a function of the height and profile of said elongated portion, and (e) means for translating the positioning of said collimating means into a measurement of the height and contour of said surface of said material in said blast furnace.

4. Apparatus for determining the height and contour of a surface of dense solid material which surface may vary differentially in a vertical direction and so be displaced from a horizontal reference plane comprising:

(a) means positioned above said surface for irradiating a localized zone of said surface whereby said dense material scatters said radiation, (b) detecting means positioned above said surface along a vertical plane that intersects perpendicularly a vertical plane that passes through said localized zone for detecting the magnitude of said scattered radiation, (c) means for moving said detecting means so as to direct said detecting means along the zone of maximum scattered radiation so that the movements of said detecting means are functions of the height of said zone relative to said horizontal reference plane, and (d) means for translating said movements into indications of the height and contour of said surface.

5. In combination with a vertically movable surface of dense material, (a) a radiation source positioned above said surface for irradiating a localized zone of said surface whereby said dense material scatters said radiation, (b) a radiation detector, (c) means for moving said detector around its vertical and horizontal axes and for maintaining said detector pointed at said zone as said surface moves vertically, (d) first means for indicating the horizontal movement of said detector, (e) second means for indicating the vertical movement of said detector, and (f) means for co-ordinating the indications of said first and second means so as to determine the height and profile of said localized zone.

6. An apparatus substantially as described in claim 5 wherein:

(a) the first means comprises a pair of potentiometers mechanically connected to the means for moving the detector around its vertical axis, (1) one of said potentiometers being wound to give a voltage proportional to the tangent of the horizontal angle rotated from a vertical reference plane, and (2) the second potentiometer being actuated to give a voltage proportional to the secant of said horizontal angle, and (b) the second means is a potentiometer wound to give a voltage proportional to the tangent of the vertical angle rotated from a horizontal reference plane.

7. Apparatus for determining the elevation and contour of an irregular surface comprising:

(a) means positioned above said surface for irradiating a localized portion of the surface, (b) rotatable means for detecting scattered radiation, said detecting means being so positioned above said surface relative to said localized portion that having rotated said detecting means to direct said detecting means toward any given point on said localized portion, the location of said given point may be expressed as a function of the angular rotation of said detecting means with respect to a pair of mutually perpendicular reference planes, (c) first means connected to said detecting means for rotating said detecting means in a substantially horizontal plane, (d) second means connected to said detecting means for rotating said detecting means in a substantially vertical plane, (e) control means connected to said second means for maintaining said detecting means directed at said localized portion during rotation of said detecting means by said first means, and (f) means connected to said control means for translating the movements of said first and second means into a measurement of the elevation and profile of said localized portion.

References Cited in the file of this patent

UNITED STATES PATENTS

| | | |
|---|---|---|
| Re. 22,531 | Hare | Aug. 22, 1944 |
| 2,348,810 | Hare | May 16, 1944 |
| 2,503,770 | Robinson | Apr. 11, 1950 |
| 2,621,808 | Blakeney | Dec. 16, 1952 |
| 2,675,478 | Brunton et al. | Apr. 13, 1954 |
| 2,675,482 | Brunton | Apr. 13, 1954 |
| 2,828,422 | Steierman | Mar. 25, 1958 |

FOREIGN PATENTS

| | | |
|---|---|---|
| 717,753 | Great Britain | Nov. 3, 1954 |

OTHER REFERENCES

Applications of Radioisotopes To Control Technological Processes, by Jordan et al., International Conference on Peaceful Uses of Atomic Energy, vol. 15, pages 135 to 141, 1955, United Nations Press.

UNITED STATES PATENT OFFICE
CERTIFICATE OF CORRECTION

Patent No. 3,099,744                                    July 30, 1963

Robert B. Spooner

It is hereby certified that error appears in the above numbered patent requiring correction and that the said Letters Patent should read as corrected below.

Column 1, line 9, strike out "process"; column 6, line 19, for "potentiometer" read -- potentiometers --; column 10, lines 57 and 58, for "horizontally" read -- horizontal --.

Signed and sealed this 30th day of June 1964.

(SEAL)
Attest:

ERNEST W. SWIDER                                              EDWARD J. BRENNER
Attesting Officer                                                 Commissioner of Patents